June 2, 1942.  K. C. ALLEN  2,284,789

MILL FOR GRANULATING AND PULVERIZING COFFEE

Filed Jan. 31, 1940    2 Sheets-Sheet 1

INVENTOR
Kenneth C. Allen
Maréchal & Noe
ATTORNEYS

June 2, 1942.　　　　K. C. ALLEN　　　　2,284,789
MILL FOR GRANULATING AND PULVERIZING COFFEE
Filed Jan. 31, 1940　　　　2 Sheets-Sheet 2
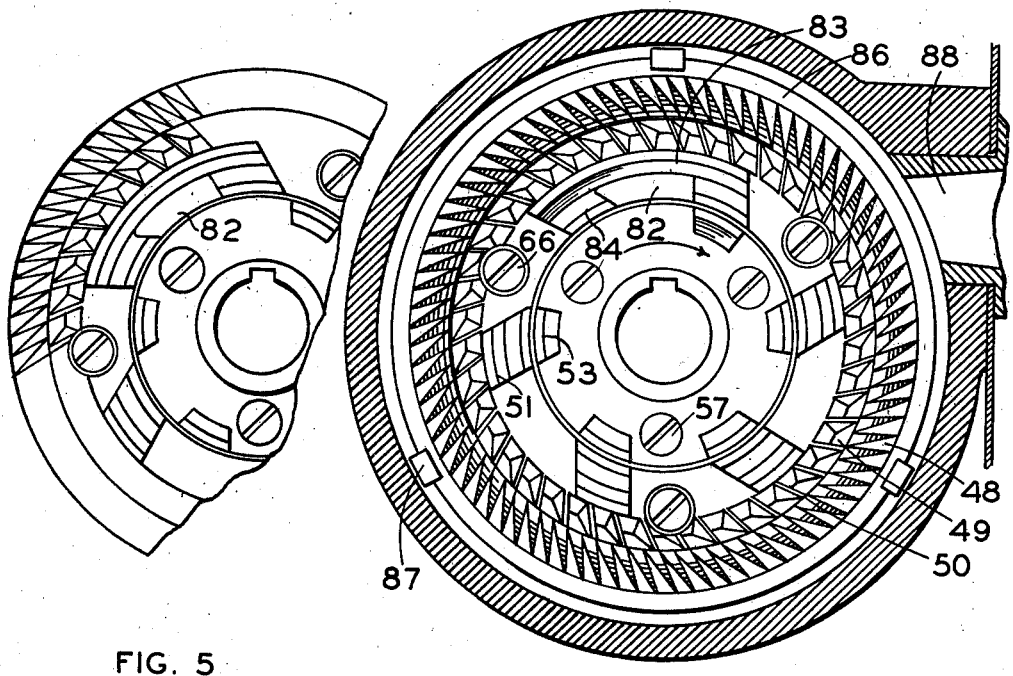
FIG. 5
FIG. 4
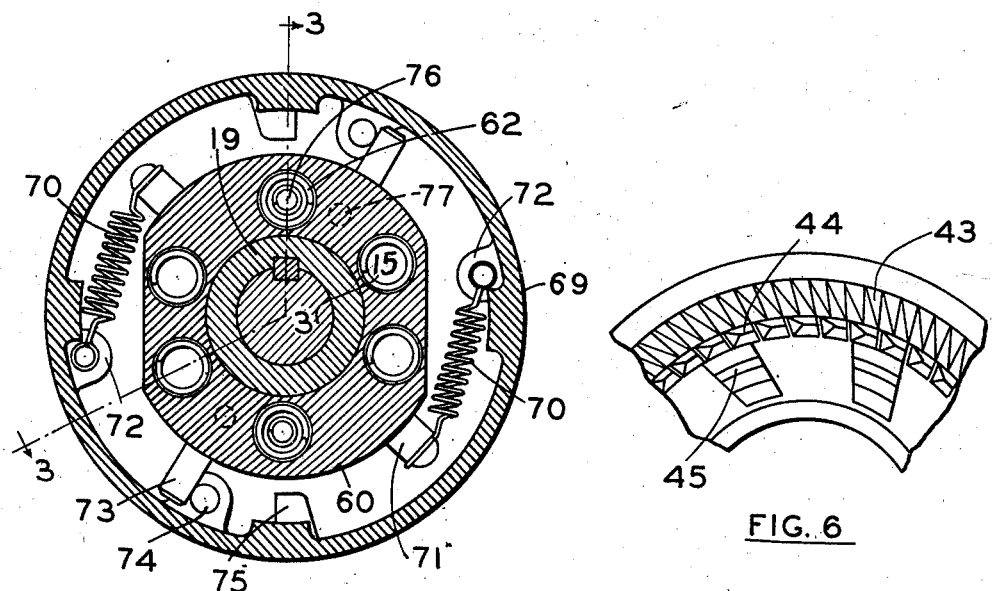
FIG. 2
FIG. 6
INVENTOR
Kenneth C. Allen
BY
Marechal & Noe
ATTORNEYS Patented June 2, 1942

2,284,789

UNITED STATES PATENT OFFICE 2,284,789

MILL FOR GRANULATING AND PULVERIZING COFFEE

Kenneth C. Allen, Dayton, Ohio, assignor to The Hobart Manufacturing Company, Troy, Ohio, a corporation of Ohio Application January 31, 1940, Serial No. 316,470

18 Claims. (Cl. 83—18)

This invention relates to food handling apparatus and more particularly to grinding mills for handling coffee and the like.

It is the principal object of the present invention to provide a coffee mill which is adjustable over a selective range of fineness of grind from relatively coarser or granulating to relatively finer or pulverizing conditions and in which the rate of feed of coffee to the mill is suitably controlled in different portions of the range to be within the capacity of the mill to handle so that a single coffee mill will operate throughout such range both rapidly and efficiently.

One object of the invention is the provision of a coffee mill having grade selector means operable to determine the fineness of the grind and having provision, operative upon the adjustment of the grade selector to a pulverizing setting, for reducing the rate of feed of the coffee beans to the grinding zone to a fractional part of the rate of feed corresponding to the granulating setting or settings so that the rate of supply of the coffee beans to the grinding zone will be limited to be within the capacity of the driving motor.

Another object of the invention is the provision of a coffee mill having a grade selector means and having provision for automatically controlling the rate of feed of the coffee beans to the grinding zone dependent upon whether the grinding action is of a relatively coarse or granulating character in which a high rate of feed may be used or of a relatively fine or pulverizing character in which the rate of feed must be reduced to avoid placing an excessive load upon the driving motor.

Another object of the invention is the provision of a grinding mill of the character mentioned in which the torque exerted on a grinding member is effective, in a pulverizing action, to restrict the rate of feed of the material to the grinding zone.

Another object of the invention is the provision of a grinding mill having cooperating relatively rotatable grinding members, one of which embodies a plurality of relatively adjustable portions that are shiftable from a position in which a rapid feed is provided to the grinding zone to a predetermined position in which the feed is restricted to a comparatively small controlled rate.

Another object of the invention is the provision of a grinding mill for both granulating and pulverizing, having a feed controlling means which is yieldably held in pulverizing adjustment to prevent objectionable variation in grind and hunting of the mechanism.

Another object of the invention is the provision of grinding means including relatively rotatable grinding members, one of which is provided with an annular barrier arranged between an annular series of granulating teeth, and a restricted supply passage affording access of the material to be ground to the grinding zone, the arrangement being such that the barrier causes an annular travel of the material before the material is acted upon by the granulating teeth and limits the rate of supply of the material to the grinding zone.

Other objects and advantages of the invention will be apparent from the following description, the accompanying drawings, and the appended claims.

In the drawings,

Fig. 2 is a vertical section on the line 2—2 of Fig. 3;

Fig. 4 is a section on the line 4—4 of Fig. 3, showing the rotatable grinding member adapted for a granulating action;

Fig. 5 is a fragmentary view corresponding to Fig. 4 but with the parts arranged for a pulverizing action; and Fig. 6 is a fragmentary view of the stationary grinding member.

Figure 1:
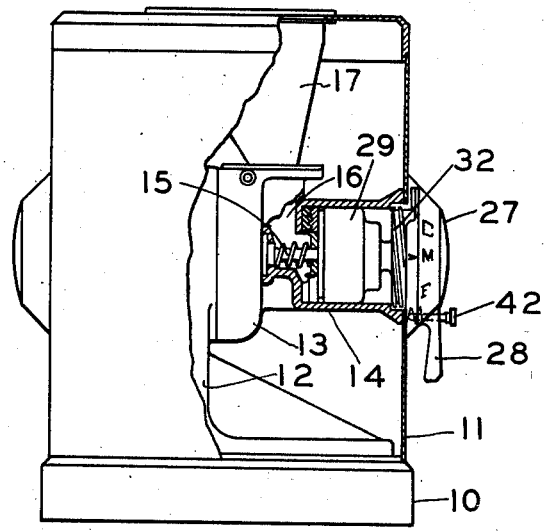
Fig. 1 is a side elevational view of a coffee mill embodying the present invention, showing a portion of the mill in section.

Referring more particularly to the drawings, in which a preferred embodiment of the invention has been illustrated, there is shown at 10 a base member adapted to support a housing 11, within which is a motor pedestal 12 supporting an electric driving motor 13. The motor supports a projecting grinding or burr casing 14. The motor shaft 15 extends in overhanging relation into the grinding casing and through a supply passage 16 to which the coffee beans or material to be ground is supplied from the feeding means or hopper 17 which is positioned in the housing 11.

On the motor shaft 15 is a longitudinally slidable hub 19 which carries the rotatable grinding member or burr 20 adapted for cooperation with a stationary grinding member 21. Attaching screws 22 hold the grinding member 21 in fixed position at the supply end of the casing 14. A key 24 held on the hub 19 by means of a holding screw 25 is longitudinally movable in a key slot provided longitudinally in the shaft 15 so that the hub 19 will be positively rotated by the shaft but can move longitudinally along the shaft to permit adjustment of the space between the rotatable and stationary grinding burrs for adjustment of the fineness of the grind.

The grade selector which, as herein shown, is arranged to provide a plurality of granulating settings and a pulverizing setting, comprises a disk 27 having a beveled surface bearing index marks showing the positioning of the selector. A handle 28 permits the disk to be conveniently rotated. The disk is attached to a guide member 29 by means of bolts 30, the guide member being slidably and rotatably carried in the casing 14 and having a suitable recess 31 for receiving the rotatable parts of the grinding mechanism. On the member 29 is an external spiral thread 32 adapted to fit within a cooperating spiral groove formed in a ring 33 which is fixed to the housing 11 by means of screws 34. Rotational movements of the disk 27 will thus cause it to shift longitudinally with respect to the shaft axis, this longitudinal movement being transmitted to the end wall 36 of the hub 19 by means of the rod 37 on which is fixed a pressure transmitting block 38 of wood or other suitable material. The outer end of the rod 37 is adjustably threaded in the disk 27 and may be rotated therein to provide a "zero" adjustment, that is so that the markings on the disk indicating the fineness of grind can be made to accurately correspond with the setting of the burrs. Locking means comprising a bar 39 threaded on the rod 37 and adapted to be placed under tension by means of screws 40 serve to maintain the rod 37 fixed in a predetermined position with respect to the disk 27. A retractable spring-pressed holding plunger 42 forms a latch which yieldingly retains the grade selector disk 27 in any predetermined adjusted position.

As will be apparent from Fig. 6, the stationary grinding burr 21 is provided with a series of rather shallow and rather closely spaced pulverizing teeth 43 arranged in an annular row near the peripheral portion of the burr. An annular series of granulating teeth 44 is provided within the pulverizing teeth, and a double series of rather widely separated projections 45 provide cracker teeth for cracking the coffee beans into smaller portions before the broken-up portions are acted upon by the granulating teeth 44.

Figure 3:
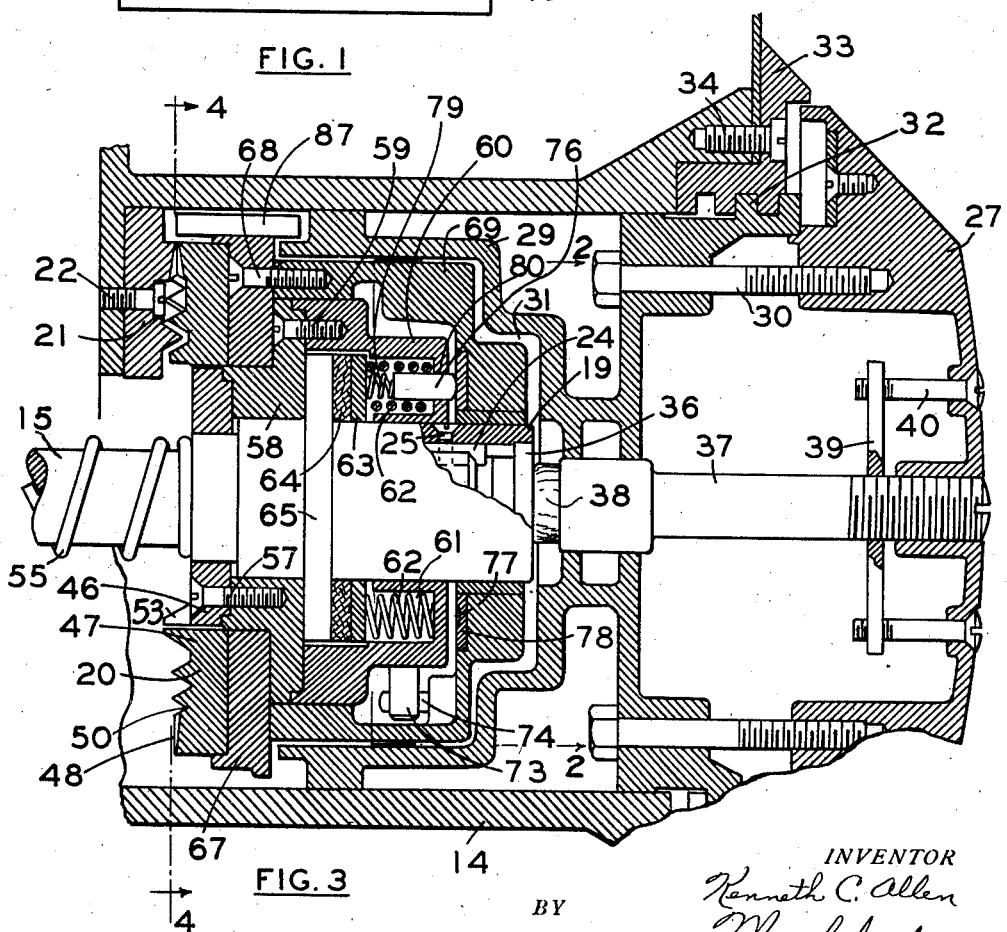
Fig. 3 is a vertical sectional view through the grinding casing, the line of section being indicated by line 3—3 of Fig. 2.

The rotatable grinding burr comprises an inner portion 46 and an outer portion 47 which normally, during granulating settings, have a definite relation with respect to one another, this relation being shown in Fig. 4. On the outer portion 47 of the rotatable grinding burr there is a series of pulverizing teeth 48, and a series of granulating teeth 49. The groove 50 provided between the granulating teeth 49 and the pulverizing teeth receives the granulating teeth 44 of the stationary burr, as shown in Fig. 3. Within the series of granulating teeth on the rotatable grinding burr is a double series of more widely spaced projections 51 providing cracker teeth adapted for cooperation with the cracker teeth of the stationary grinding burr.

On the inner portion 46 of the rotatable grinding burr there is a series of projections 53 which project out towards the stationary grinding burr far enough to prevent the passage of a whole coffee bean except through the spaces between adjacent projections 53, in the position of the parts shown in Fig. 4. Normally, these projections 53 on the inner portion are in registration with the cracker teeth 51 on the outer portion so that the spaces between adjacent projections 53 afford a space or passage of considerable size through which a comparatively large number of coffee beans can travel outwardly to the grinding zone of the grinding members. The coffee beans may be moved along the passage 16 from the feeding hopper towards the inner portions of the grinding burrs by means of a helical band or wire 55 fixed on the motor shaft.

It is desirable where a coffee mill of this character is to be utilized in a retail store for example that it provide for grinding the coffee as rapidly as possible and without undue delay. Thus in the normal granulating settings of the mill the feed may be quite rapid, since the torque required for granulating operations is not ordinarily excessive. However when the mill is adjusted to produce finer grinds, the coffee is broken up into a greater number of particles and this requires a progressively greater increase in the power. As the size characteristics are reduced from a finer granulated grind and merging into a pulverizing grind, the load upon the motor for the same rate of feed of coffee is greatly increased. Hence to avoid placing an excessive load upon the driving motor such as might cause stalling thereof, provision is made for adequately limiting the rate of feed of coffee into the grinding burrs during the pulverizing grind, so that the load placed upon the motor will not be in excess of that which it can properly handle. The control for the feed is preferably made automatic such that whenever the mill is operated with the grade selector adjusted for the fine grind or pulverizing conditions, the rate will be properly restricted, the mill being again restored to a high feed condition upon the resetting of the grade selector to any of the relatively coarser or granulating positions. In this way the operator is relieved of the necessity for making adjustment, and assurance is provided that the maximum safe rate of feed will take place under all conditions of operation. It will be understood that the term "pulverizing" as used herein refers to the finer portion of the range of grinds, while the term "granulating" refers to the relatively coarser portion of the range.

In accordance with the illustrated embodiment of the invention, the inner portion 46 of the rotatable grinding burr is attached by screws 57 to a supporting plate 58, which is connected by screws 59 to a driving member 60 in which there are a number of cylindrical sockets 61 which receive springs 62 acting against a pressure disk 63 which presses against a friction disk 64 bearing against a flange 65 on the hub 19. The springs 62 thus yieldingly clamp the plate 58 against the flange 65 so that, except in the case of an overload, the inner portion of the rotatable grinding burr will rotate with the hub 19 although both inner and outer portions 46 and 47 respectively can stop in case of an unusually high load condition to prevent injury to the parts. The outer portion 47 of the grinding disk is connected by screws 66 to a carrying plate 67, which is held by screws 68 on a rotatable member 69 which is capable of some rotatable shifting movement with respect to the hub 19 and with respect to the member 60. Under normal conditions of a granulating action, the outer portion of the rotatable grinding burr will be rotated along with the inner portion, as it is yieldingly connected to the inner portion through springs 70 which connect pins 71 on the part 60 to lugs 72 on the part 69. These springs are of sufficient strength to overcome the torque applied to the outer portion of the grinding burr, during granulating actions, and normally maintain a stop pin 73 on part 60 against a locating pin 74 on the part 69, thus yieldingly maintaining the inner and outer portions of the rotatable grinding burr in a definite normal position, shown in Fig. 4, for granulating action.

In a pulverizing action the torque applied to the outer portion 47 is considerably in excess of the strength of the springs 70, and these springs, therefore, yield and permit backward rotation of the outer portion 47, thus shifting the outer portion into a second predetermined position with respect to the inner portion, as indicated in Fig. 5. This position of the parts will be yieldingly maintained throughout the pulverizing action in spite of fluctuations of the torque of the outer grinding portion by means of spring pressed pins 76, the outer ends of which are rounded and adapted to engage in sockets or depressions 77 in a hard plate member 78 fixed to the part 69. Each of the pins 76 is pressed outwardly by a spring 79 and operates through an opening 80 in the end of the part 60, normally riding, in a granulating action, against a flat surface of the plate 78, but with the two pins simultaneously engaging the two sockets, in a pulverizing action. When the pins 76 engage their respective sockets the pins 71 are in contact with stop lugs 75 on the part 69.

When the pins 76 engage the sockets 77, the projections 53 of the inner portion of the grinding burr 20 will be in registration with the spaces provided between adjacent projections or cracker teeth 51 of the outer portion of this grinding member, thus blocking off the entrance passage of the coffee beans except for one supply passage 82 which is always open because there is no projection 53 opposite this particular passage. The coffee beans, in a pulverizing action, can travel only at a comparatively small rate through the comparatively small passage 82, and the construction, furthermore, is such that even after they enter the passage 82, the coffee beans cannot immediately travel outwardly to the granulating teeth, but must first be broken up one at a time by the cracker teeth and the pieces caused to take an annular path of movement before moving outwardly. For this purpose, the outer portion of the rotatable grinding burr is provided with an annular barrier 83 arranged beyond the passage 82 and of sufficient length to give the required travel to the initially broken-up pieces of the coffee beans before those pieces can move out and be engaged by the granulator teeth. This barrier 83 extends continuously between widely spaced points back of the two adjacent sets of cracker teeth on the outer portion 47 as will be apparent from Fig. 4, and the space between the barrier 83 and the cracker teeth 51 which are immediately in front of it affords a constricted annular passage 84 between the stationary and rotatable burrs, this passage being smaller than the bean size so that the beans will be broken up one at a time by the cracker teeth on the burrs as they enter this passage and before they reach the end of the passage. This affords a controlled slow rate of feed of the coffee to the grinding or pulverizing zone. The cracked pieces leaving the end of the passage 84 are then granulated to the required degree of fineness by the granulating teeth of the two burrs and then flow outwardly past the pulverizing teeth which act to give a final pulverizing action before the powdered particles reach the outer or discharge space 86. The pulverized coffee is carried around in the space 86 by means of discharge bars 87 fixed on the plate 67, and passes out through the discharge opening 88 which, as shown, is at one side of the discharge passage.

During the pulverizing action it will thus be apparent that the torque applied to one of the grinding members acts to shift the parts to control the rate of feed so as to limit the rate to one that can be adequately handled by the motor, the spring pressed pins 76 yieldingly maintaining the parts in position for the limited feed in spite of fluctuations in torque during the pulverizing action, thus avoiding a hunting action. However when the flow of material into and through the grinding zone ceases, the spring-pressed pins 76 are forced back out of their sockets 77 by the action of the springs 70 which serve to shift the outer portion of the rotatable grinding burr back to its original position and thus adapts the feed to a granulating setting so that if the operator then sets the grade selector device for one of the granulating settings he need give no further attention to the feed adjustment. The operator is thus only required, in making a grade selection, to move a single member and is not called upon to coordinate some independent feed control with the particular spacing provided for the grinding burrs, and provision is made for securing the maximum safe rate of feed and of operation of the mill in all conditions of grind.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A coffee mill of the character described adapted for producing both granulating and pulverizing grinds comprising grinding means, drive means for operating said grinding means to grind coffee, a grade selector member cooperating with said grinding means for varying the fineness of grind thereof over a range of granulating grinds and into a finer pulverizing grind, a hopper for receiving the coffee to be ground and supplying the same into said grinding means, means carried by said grinding means and operable during pulverizing grinding for limiting the rate of supply of coffee beans from said hopper into said grinding means to a reduced feeding rate, and means interconnecting the grade selector member and said supply limiting means and operable when the grade selector member is returned to a granulating position for withdrawing the action of said supply limiting means to provide for feeding at a higher rate.

2. A coffee mill of the character described adapted for producing selectively both granulating and pulverizing grinds comprising a casing, relatively rotatable cooperating grinding members in said casing, drive means for operating said grinding means, a grade selector for adjustably setting the spacing of said grinding members and providing a plurality of predetermined granulating settings and a predetermined pulverizing setting, hopper means for feeding coffee beans to said grinding members in both granulating and pulverizing settings thereof, means carried by said grinding means and normally inoperative in the granulating settings of the grinding members for reducing the rate of feed of the coffee beans to the grinding zone, and means effective when said grade selector means is in pulverizing setting for rendering said feed rate reducing means operative to provide for continuing supply of coffee to said grinding members at a limited rate.

3. A coffee mill of the character described comprising a casing, relatively rotatable cooperating grinding members in said casing, grade selector means for adjusting the spacing of said grinding members to provide a selective range of fineness of grind with the power required for the grinding increasing with decrease in the size of the ground product, means for feeding coffee beans to said grinding members, feed controlling means having a plurality of positions of adjustment in one of which the coffee beans are rapidly supplied to the grinding zone of the grinding members and in another of which the coffee beans are supplied at a more limited rate, means for normally maintaining said feed controlling means in the first named adjustment for a relatively coarser setting of said grade selector member, and means interconnecting said feed controlling means and said grade selector means and operable when the grade selector is set to a relatively finer adjustment for adjusting the feed controlling means to its second named adjustment.

4. A coffee mill of the character described comprising a casing, relatively rotatable cooperating grinding members in said casing, drive means for said grinding members, a grade selector for adjusting the spacing of said grinding members and providing a selective range of fineness of grind with the power required for the grinding operation increasing with decrease of the size of the ground product, means for feeding coffee to be ground to said grinding members, means for reducing the rate of feed of coffee beans to said grinding members, and means responsive to the torque upon said grinding members for automatically controlling said feed reducing means and operable upon adjustment of said grade selector to the finer portion of said range of fineness to provide a limited rate of supply of coffee beans to the grinding members within the capacity of the drive means and operable upon adjustment of said grade selector to the coarser portion of said range to supply the coffee beans at a greater rate for more rapid grinding.

5. A grinding mill of the character described comprising a casing, relatively rotatable cooperating grinding members in said casing, grade selector means for adjusting the spacing of said grinding members and providing a selective range of fineness of grind, means for feeding material to be ground to said grinding members, one of said grinding members having relatively shiftable portions provided with means controlling the rate of feed of material to the grinding zone, yielding means holding said portions in a normal predetermined relationship affording an opening for a comparatively large rate of feed when said grinding members are adjusted to grind in the coarser portion of said range of fineness to the grinding zone for granulating action, said portions being shiftable automatically upon the increased torque of grinding in the finer portion of said range to reduce the size of said opening to limit the rate of supply to the grinding zone under such conditions.

6. A grinding mill of the character described comprising a casing, relatively rotatable cooperating grinding members in said casing, grade selector means for adjusting the spacing of said grinding members and providing granulating and pulverizing adjustments, means for feeding material to be ground to said grinding members, one of said grinding members having relatively shiftable portions provided with means controlling the rate of feed of material to the grinding zone, yielding means holding said portions in a normal predetermined relationship affording a comparatively large opening with corresponding high rate of feed to the grinding zone for granulating action, said portions being shiftable automatically upon the increased torque of a pulverizing action to a second predetermined relationship in which the size of the opening and correspondingly the rate of supply to the grinding zone are limited, and means for yieldingly holding said portions in said second predetermined relationship with a force less than that exerted by said yielding means providing for return of said portions to normal predetermined relation in the absence of said increased torque.

7. A grinding mill of the character described comprising a casing, relatively rotatable cooperating grinding members in said casing, grade selector means for adjusting the spacing of said grinding members, one of said grinding members having an annular series of spaced projections, and having a second series of spaced projections normally in registration with the projections of the first series and providing a passage between successive projections for the supply of the material to be ground to the grinding zone of said grinding members, means for supporting said series of projections separately for movement relative to each other and means for shifting the second series of projections arcuately with respect to the first series to change the size of said passage.

8. A grinding mill of the character described comprising a casing, relatively rotatable cooperating grinding members in said casing, grade selector means for adjusting the spacing of said grinding members, one of said grinding members having an annular series of spaced projections, and having a second series of spaced projections normally in registration with the projections of the first series and providing a passage between successive projections for the supply of the material to be ground to the grinding zone of the said grinding members, and means automatically operable in accordance with the torque of the said grinding member for shifting the second series of projections out of said registration with the first series to change the size of said passage.

9. In a grinding mill of the character described, a casing, relatively rotatable cooperating grinding members in said casing, grade selector means for adjusting the spacing of said grinding members to provide granulating and pulverizing actions, one of said grinding members having a plurality of relatively adjustable portions provided with means controlling the rate of feed of material to the grinding zone of said grinding members, means for mounting said adjustable portions on said one grinding member for relative movement with respect thereto in response to an increase of torque thereon during a pulverizing action to automatically restrict the rate of feed of the material to the grinding zone of the grinding members, and means for restoring said adjustable portions to their original position to provide for higher rate of feed in the absence of said increased torque.

10. In a grinding mill of the character described, a casing, relatively rotatable cooperating grinding members in said casing, grade selector means for adjusting the spacing of said grinding members to provide granulating and pulverizing actions, one of said grinding members having a plurality of relatively adjustable portions provided with means controlling the rate of feed of material to the grinding zone of said grinding members, means for mounting said adjustable portions on said one grinding member for relative movement with respect thereto in response to an increase of torque thereon during a pulverizing action to automatically restrict the rate of feed of the material to the grinding zone of the grinding members, means for restoring said adjustable portions to their original position to provide for higher rate of feed in the absence of said increased torque and means for yieldingly maintaining said adjustable portions in a predetermined feed restricting position of adjustment during torque variations in a pulverizing action.

11. A grinding mill of the character described comprising a casing, fixed and cooperating rotatable grinding disks in said casing having granulating teeth and pulverizing teeth thereon, grade selector means for adjusting the spacing of said grinding disks, means for feeding material to be ground to the inner portions of said grinding disks, said rotatable disk having baffle means projecting toward said fixed disk and providing a supply space of limited annular extent between the grinding disks through which the material travels out to the grinding zone, said rotatable disk having an arcuate barrier out radially beyond said supply space causing an annular travel of the material after passing said space and before it is engaged by the granulating teeth, and means operable during a grinding operation for shifting said baffle means to vary the size of said supply space.

12. A coffee mill of the character described comprising a casing, relatively rotatable cooperating grinding disks in said casing having granulating teeth and pulverizing teeth, means for feeding the coffee beans to be ground to the inner portions of said grinding disks, one of said disks having baffle means projecting toward the other disk and providing a supply space of limited annular extent between the grinding disks through which the coffee travels out to the grinding zone, said disk having an arcuate barrier out radially beyond said supply space causing an annular travel of the coffee after passing said space and before it is engaged by the granulating teeth, the other disk having cracker teeth cooperating with said baffle means and barrier to crack the coffee beans, and means operable during a grinding operation for shifting said baffle means to vary the size of said supply space.

13. A coffee mill of the character described comprising a casing, relatively rotatable cooperating grinding members in said casing, grade selector means for adjusting the spacing of said grinding members with respect to each other, one of said grinding members carrying a plurality of cooperating projections adjustable relative to each other providing a passage for the coffee beans into the grinding zone of said grinding members, and means operable without change of spacing of said grinding members for changing the relative position of said projections to restrict the size of the feed passage.

14. A coffee mill of the character described comprising a casing, a grinding burr in said casing having a plurality of relatively adjustable portions, means normally maintaining said portions in a predetermined radial relationship, said portions having cooperating baffles normally in registration and normally providing a passage for the coffee beans into the grinding zone, a second grinding burr cooperating with the first grinding burr, means for relatively adjusting the radial relationship of said portions to vary the size of said passage, and grade selector means for adjusting the spacing of said grinding burrs.

15. A coffee mill of the character described comprising a casing, a rotatable grinding burr in said casing having a plurality of relatively adjustable portions, means for rotating said burr, means normally maintaining said portions in a predetermined relationship, said portions having cooperating baffles normally in angular registration and normally providing a passage for the coffee beans into the grinding zone, a second grinding burr cooperating with the first grinding burr, means for relatively adjusting the angular registration of said portions to vary the size of said passage, and grade selector means for adjusting the spacing of said grinding burrs.

16. A grinding mill of the character described comprising a casing, relatively rotatable cooperating grinding members in said casing, grade selector means for adjusting the spacing of said grinding members to provide for relatively fine grinds and relatively coarser grinds, means for continuously supplying material to be ground to the grinding zone of said grinding members throughout both said fine and coarser settings thereof, means operable by one of said grinding members in a position of predetermined adjusted spacing from the other of said members for reducing the rate of feed to the grinding zone to a predetermined limited rate while maintaining said predetermined adjusted spacing, and means responsive to a predetermined increase in torque as caused by operation of said grinding means at said fine setting for operating said feed limiting means.

17. A coffee mill of the character described comprising a casing, grinding means comprising relatively rotatable cooperating grinding members in said casing, grade selector means for adjusting the spacing of said grinding members and providing a plurality of granulating adjustments and a pulverizing adjustment, means for feeding coffee to be ground to said grinding members, and means carried by the grinding members and separate from said feeding means for supplying coffee beans from said feeding means to the grinding zone of said grinding members at a limited rate for a pulvarizing action and for supplying the coffee beans at a much greater rate from said feeding means to said grinding zone for granulating action.

18. In a coffee mill adapted for supplying coffee beans to be ground by a pulverizing action, the combination of a grinding disk having an outer series of pulverizing teeth, an inner series of cracker teeth, and an intermediate series of granulating teeth, baffle means on said disk providing a restricted passage for the flow of coffee into said teeth, an arcuate barrier on said grinding disk between the granulating teeth and the supply location and in line with said passage to force arcuate travel of all of the coffee beans in the course of said pulverizing action, a cooperating grinding disk, and means for rotating one of said disks.

KENNETH C. ALLEN.